Nov. 11, 1947.        R. B. LIGHTFOOT        2,430,820
              AIRPLANE OF LOW ASPECT RATIO
                    Filed Dec. 4, 1941
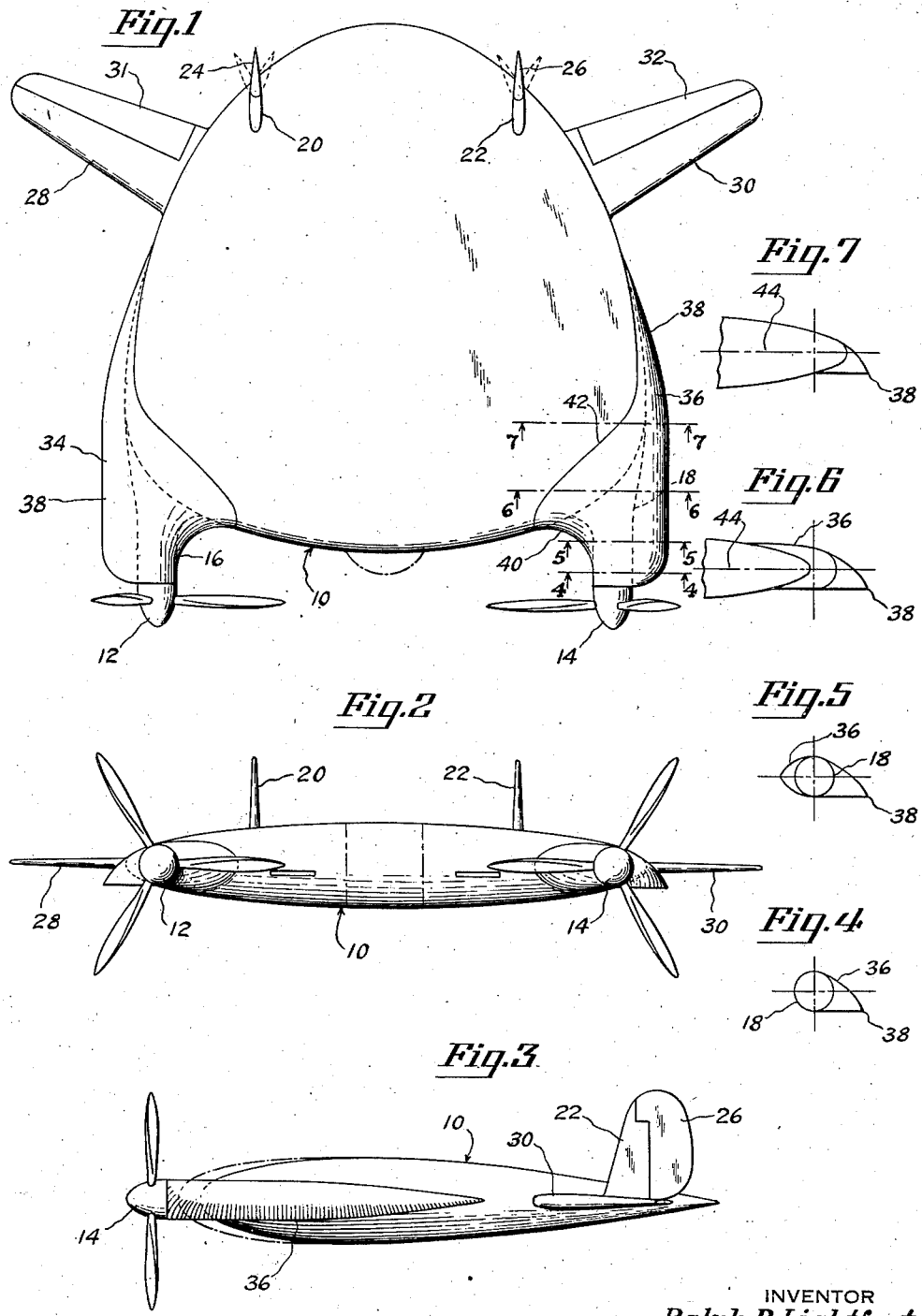
INVENTOR
Ralph B. Lightfoot
BY
Harris G. Luther
ATTORNEY Patented Nov. 11, 1947

2,430,820

UNITED STATES PATENT OFFICE 2,430,820

AIRPLANE OF LOW ASPECT RATIO

Ralph B. Lightfoot, Stratford, Conn., assignor to United Aircraft Corporation, East Hartford, Conn., a corporation of Delaware Application December 4, 1941, Serial No. 421,607

8 Claims. (Cl. 244—36)

This invention relates to improvements in airplanes and has particular reference to an improved airplane of low aspect ratio sometimes referred to as a flying wing type of airplane.

An object of the invention resides in the provision of means for improving the maneuverability of such an airplane particularly in lateral or rolling movements.

Other objects and advantages will be more particularly pointed out hereinafter or will become apparent as the description proceeds.

In the accompanying drawing, in which like reference numerals are used to designate similar parts throughout, there is illustrated a suitable embodiment for the purpose of disclosing the invention. The drawing, however, is for the purpose of illustration only and is not to be taken as limiting or restricting the scope of the invention since it will be apparent to those skilled in the art that various changes in the illustrated arrangements may be resorted to without in any way exceeding the scope of the invention.

In the drawing,

Fig. 1 is a plan view of a low aspect ratio airplane of the character indicated above, showing the application thereto of lateral fairings constructed according to the invention for improving the maneuverability of the airplane, particularly in lateral or rolling movements.

Fig. 2 is a front elevational view of the airplane illustrated in Fig. 1.

Fig. 3 is a side elevational view of the airplane illustrated in Fig. 1.

Fig. 4 is a sectional view on the line 4—4 of Fig. 1.

Fig. 5 is a sectional view on the line 5—5 of Fig. 1.

Fig. 6 is a sectional view on the line 6—6 of Fig. 1, and

Fig. 7 is a sectional view on the line 7—7 of Fig. 1.

Referring to the drawing in detail, the numeral 10 generally indicates the main wing portion of the airplane which main wing may contain the pilot compartment as well as compartments for one or more engines driving the propellers 12 and 14. These propellers are disposed somewhat ahead of the main wing portion 10 at each side thereof and are supported by extensions or nacelles 16 and 18 extending forwardly from the main wing at the lateral extremities thereof. The main wing may also be provided with one or more fixed vertical fin surfaces, as indicated at 20 and 22 which fins may carry manually controllable rudder members as indicated at 24 and 26.

Projecting outwardly from each side of the main wing member 10 near the rearward portion thereof are a pair of stabilizing vanes 28 and 30. Each of these vanes may embody a manually controllable aileron as indicated at 31 and 32 respectively and the vanes themselves may be manually rotatable to constitute them elevators for controlling the pitching movements and angle of attack of the airplane. Both of the stabilizing vane units would be moved together to accomplish the pitch controlling function while the ailerons 31 and 32 would be moved differentially to control the lateral or rolling movements of the airplane.

In the type of airplane illustrated the main wing has a substantially symmetrical airfoil section both transversely and longitudinally, as is particularly illustrated in Figs. 2 and 3. This means that the curvature of the undersurface of this main wing portion is similar to the curvature of the upper surfaces and that the undersurface recedes upwardly in all directions from its lowest point. Such a wing will not readily move sideways in what is known as a "side-slip" which is a maneuver frequently used to lose altitude without increasing the forward speed of the airplane. When it is attempted to tilt the form of wing shown in Figs. 1, 2 and 3 and cause it to descend laterally, the air forces generated by this maneuver produce such a strong restoring force that after a very short slip the airplane is restored to its laterally horizontal position. This characteristic also results in other undesirable behavior. For example, because of this excesssive rolling moment resulting from lateral motion the airplane has a tendency to perform an unstable lateral oscillation or "dutch roll." Furthermore, it tends to be undesirably responsive to side gusts.

It is among the objects of this invention to somewhat decrease this rolling moment caused by sideslip of a main wing of the form shown in Figs. 1, 2 and 3, as illustrated above, so that the undesirable effects referred to will be decreased or eliminated. In carrying out this object fairings, as indicated at 34 and 36 are placed over the propeller supporting nacelles and extended rearwardly along the corresponding sides of the main wing portion. As these fairings are similar in all respects except that one is made for the right hand side of the airplane and the other is made for the left hand side, a description of only one is sufficient to completely disclose the invention.

Figs. 4, 5, 6 and 7 represent sections taken on different stages along the left hand fairing 36 as indicated by the section lines 4—4, 5—5, 6—6 and 7—7.

At the station 4—4 near the propeller 14, as particularly shown in Fig. 4, the fairing does not alter the shape of the right hand side (as viewed from the rear) of the propeller supporting nacelle 18 but provides a lateral extension upon the left hand side of the propeller supporting nacelle, this extension tapering from the top and bottom of the nacelle to an edge 38 located outwardly from the nacelle. As is particularly shown in Figs. 1, 4, 5, 6 and 7, this edge 38 is carried rearwardly in substantially the same horizontal plane and is gradually tapered in to meet the lateral edge of the main wing beginning at a location somewhat to the rear of the base of the propeller supporting nacelle 18. Ahead of the station 4—4 the fairing is faired into the propeller supporting nacelle and, as it progresses rearwardly from this station, it is also faired to the main wing on the right hand side of the nacelle, as indicated by the curved lines 40 and 42. Rearwardly of the base of the propeller supporting nacelle 18 the fairing constitutes a tapered lateral extension extending outwardly from the side of the main wing 10, as is particularly shown in Fig. 7. An important feature of this fairing 36 is that the edge 38 is maintained below the horizontal medial plane of the main wing 10, the illustrated form showing this edge located about half-way between the medial plane, as indicated by the line 44, and a parallel plane through the lowest point of the undersurface of the main wing.

With this arrangement of fairings the lateral restoring moments generated in a sideslip by the main wing form are reduced. In a sideslip one side of the wing is ahead of the other so that the advanced edge 38 of the fairing 36 for example becomes a leading edge while the edge of the opposite fairing 34 becomes a trailing edge. The edge 38 of the fairings being below the median plane 44 in both cases decreases the angle of attack of the faired section relative to the wind on the advanced side, with a resulting decrease in upward force on the advanced side and increases the angle of attack of the faired section relative to the wind on the opposite or trailing sides, with a resulting increase in upward force on that side. The magnitude of these upward forces is determined by the forward speed of the airplane, the angle of sideslip, the distance the edge 38 is from the median line 44 and the length of edge 38. By adjusting the length of edge 38 and the distance to the median plane 44 the forces generated by the forward speed and angle of sideslip can be limited to magnitudes which are consistent with good stability and maneuverability of the airplane.

While a suitable structural embodiment has been hereinabove described and illustrated in the accompanying drawing for the purpose of disclosing the invention, it is to be understood that the invention is not limited to the particular embodiment so illustrated and described, but that such changes in the size, shape and arrangement of the various parts may be resorted to as come within the scope of the subjoined claims.

Having now described the invention so that others skilled in the art may clearly understand the same, what it is desired to secure by Letters Patent is as follows:

1. In combination with an airplane wing of low aspect ratio having substantially symmetrical upper and lower surfaces and a propeller supporting nacelle projecting forwardly at each side thereof, a fairing of generally triangular cross-sectional shape disposed along the outer side of each propeller supporting nacelle and the adjacent portions of the lateral edges of said wing and fixed with respect thereto, each fairing having an edge disposed outwardly from said wing and below a medial plane between the upper and lower surfaces of said wing.

2. In combination with an airplane wing of low aspect ratio having upper and lower surfaces meeting in lateral edges, a fairing disposed along the forward edge portions of said wing and fixed with respect thereto, said fairing enclosing the forward lateral edges of said wing and adjacent portions of the leading edge thereof and having an edge disposed outboard of said wing and below the lateral edges of said wing, and lateral control means on said wing movable with respect to the faired wing to control the rolling movements of said wing.

3. In combination with a fixed airplane wing of low-aspect ratio having upper and lower wing surfaces, each symmetrical with respect to the transverse medial plane of the wing and meeting in lateral edges in said plane, fairing structure fixed with respect to said wing and shrouding the forward portions of said lateral edges, said fairing structure comprising laterally extended upper and lower surfaces which terminate outboard of the main wing in meeting edges disposed below said medial plane, the lower surfaces of said fairing structure being substantially parallel with said medial plane and merging into said lower wing surface and the upper surfaces of said fairing structure extending across said medial plane and merging into said upper wing surface.

4. In combination with an airplane wing of low aspect ratio having upper and lower surfaces, each symmetrical with respect to the transverse medial plane of the wing and meeting in lateral edges in said plane, lateral control means movable differentially to control the rolling movements of said wing, and means for reducing the rolling moments which, upon lateral movement of the wing, tend to resist such lateral movement comprising, fairing structure fixed to and enclosing forward portions of said lateral edges for changing the shape of said forward lateral edge portions of said wing so as to bring the faired edges below the unfaired edges, said fairing structure having upper and lower surfaces merging into said upper and lower wing surfaces respectively along lines spaced inboard from said lateral meeting edges and terminating outboard of said edges in a meeting edge below said plane.

5. In combination with an airplane wing of low aspect ratio having a high degree of lateral stability and including upper and lower wing surfaces meeting in lateral edges, ailerons carried by and movable differentially with respect to said wing to control the rolling movements of the latter, and means for reducing the lateral stability of said wing comprising fairing fixed to said wing along forward portions of said lateral edges, said fairing comprising upper and lower surfaces which meet in edges disposed outboard of said wing and below said lateral edges and which extend inboard from the lateral edges of said wing and overlie adjacent portions of said upper and lower wing surfaces respectively.

6. In combination with an airplane wing of low aspect ratio having upper and lower wing surfaces meeting in lateral edges, propeller supporting nacelles projecting forwardly from the leading edge of said wing adjacent the opposite lateral extremities thereof, a fixed fairing disposed along and enclosing the outer side of each nacelle and the adjacent forward portions of the respective lateral edges of said wing, each fairing having non-symmetrical upper and lower surfaces which merge into said upper and lower wing surfaces respectively along lines spaced inboard from the lateral edges of said wing and terminate in a common outboard edge located below said lateral edges.

7. In combination with an airplane wing of low aspect ratio having upper and lower surfaces meeting in lateral edges, propeller supporting nacelles projecting forwardly from the leading edge of the wing adjacent the opposite lateral extremities thereof, fairing fixed with respect to said wing and disposed along and enclosing the outer sides of said nacelles and the adjacent forward portions of the lateral edges of said wing, the fairing on each side of the wing comprising laterally extended upper and lower surfaces which terminate outboard of the wing in meeting edges disposed below the medial plane of said wing, the lower fairing surfaces being disposed wholly below the medial plane of the wing and the upper fairing surfaces extending upwardly from said meeting edges across said medial plane and merging into said nacelles and the adjacent forward portions of said upper wing surface.

8. In combination with an all wing airplane including forward and rearward portions forming a wing of low aspect ratio having upper and lower surfaces meeting in lateral edges located in the transverse medial plane of said wing, said forward portion having a leading edge merging rearwardly into said lateral edges, and said rearward portion having a trailing edge which merges forwardly into said edges, propeller supporting nacelles projecting forwardly from the lateral extremities of said leading edge, fairing fixed with respect to said wing and disposed along the opposite sides of said nacelles and the adjacent lateral edge portions of said wing, each fairing including laterally extended upper and lower surfaces which terminate in meeting edges disposed below said medial plane of said wing, and control means projecting laterally from said rearward wing portion on opposite sides of the fore and aft centerline of said wing and movable differentially with respect to said wing for controlling the rolling movements of said wing.

RALPH B. LIGHTFOOT.

REFERENCES CITED

The following references are of record in the file of this patent:

UNITED STATES PATENTS

| Number | Name | Date |
|---|---|---|
| 1,855,695 | Snyder | Apr. 26, 1932 |
| 1,862,102 | Stout | June 7, 1932 |
| 1,870,514 | Kontos | Aug. 9, 1932 |
| 1,981,700 | Hoffman | Nov. 20, 1934 |
| 2,062,148 | Snyder | Nov. 24, 1936 |
| 2,108,093 | Zimmerman | Feb. 15, 1938 |
| 2,210,642 | Thompson | Aug. 6, 1940 |

FOREIGN PATENTS

| Number | Country | Date |
|---|---|---|
| 149,708 | Great Britain | Aug. 17, 1920 |
| 453,030 | Great Britain | Sept. 3, 1936 |